Figure 1:
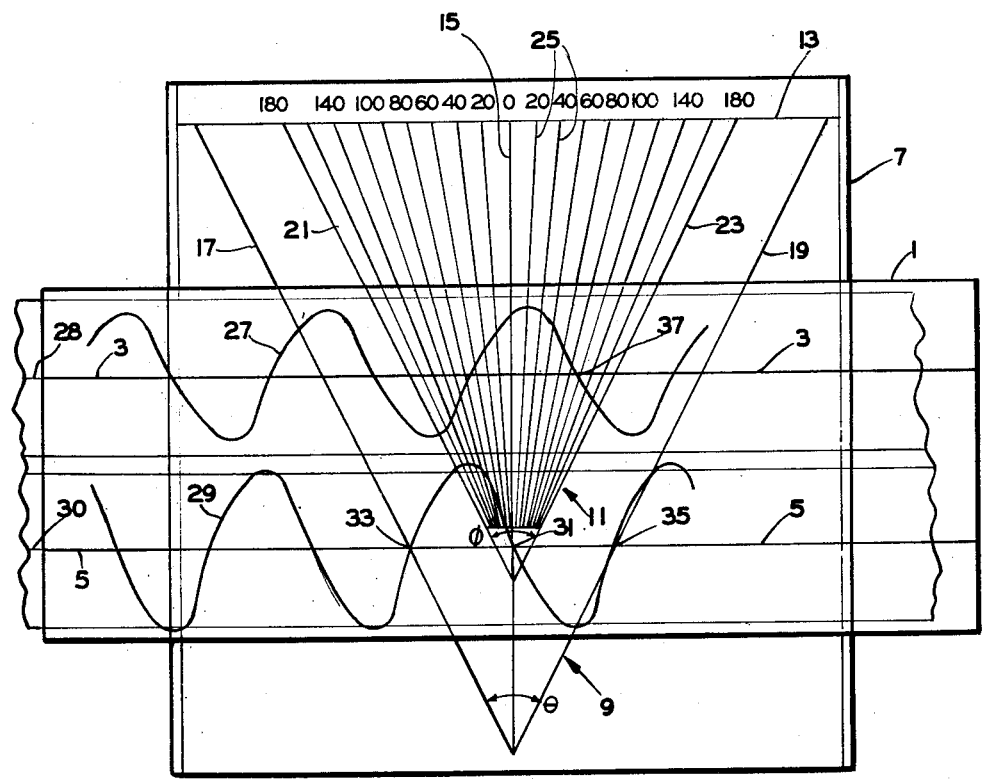

June 10, 1952

H. A. POOLE, JR 2,599,861

APPARATUS FOR MEASURING PHASE
DIFFERENCE OF PERIODIC WAVES
Filed July 28, 1950

INVENTOR.
HARMON A. POOLE JR.
BY
ATTORNEY

Patented June 10, 1952

2,599,861

UNITED STATES PATENT OFFICE 2,599,861

APPARATUS FOR MEASURING PHASE DIFFERENCE OF PERIODIC WAVES

Harmon A. Poole, Jr., Litchfield, Conn., assignor to Bendix Aviation Corporation, Teterboro, N. J., a corporation of Delaware Application July 28, 1950, Serial No. 176,432

12 Claims. (Cl. 33—1)

The invention relates to the measurement of phase difference between a pair of recorded periodic waves, and more particularly to a device for making such measurement.

In converting recorded electrical response of a servo or other device to Bode or Nyquist plots for analysis, it is necessary to determine the phase difference of the input and output waves of the device at various frequencies. The input and output waves usually are recorded on a tape by a two-channel recorder of the kind manufactured by the Brush Development Company. Heretofore, the phase difference was obtained by measuring the length of a full wave cycle and by measuring the distance between corresponding nulls on the input and output waves. From these measurements, the phase difference in degrees was calculated by multiplying by 360 the ratio of the distance between corresponding nulls to cycle length. Determination of phase shift by this means is quite tedious.

The main object of the present invention is to provide apparatus to facilitate determining the phase difference between a pair of recorded periodic waves.

Another object is to provide apparatus for measuring the relative phases of a pair of symmetric or non-symmetric recorded waves.

Another object is to provide apparatus for reading directly the relative phases of a pair of recorded periodic waves without making any calculations.

The invention contemplates a measuring device for determining the relative phases of a pair of periodic waves recorded about a pair of null lines. The device includes a reference member having a reference line adapted to be positioned in registery with the null line of one of the waves. A slide member is slidable perpendicularly to the reference line relative to the reference member and has thereon a pair of lines disposed at a predetermined angle to one another, and has a series of lines converging at a point. One of the members has a center line disposed to bisect the angle and to pass through the point and the point is spaced along the center line from the apex of the angle a distance equal to the distance between the null lines of the recorded periodic waves. A scale calibrated in angular measurements may be associated with the converging lines.

The measuring device is used to perform a method of determining the phase difference between two recorded waves. The method comprises placing a device of the kind described relative to the recorded waves so that the reference line on the reference member is aligned with a null line. The device is moved along the null line until the center line on the device extends through a null on one of the waves. The slide member of the device is moved perpendicularly to the null lines relative to the reference member until the converging lines on the slide member pass through a pair of nulls on the one wave. The angular measurement of the converging line passing through the null of the other wave corresponding to the first-mentioned null of the one wave is read on the angular measuring scale.

The foregoing and other objects and advantages of the invention will appear more fully hereinafter from a consideration of the detailed description which follows, taken together with the accompanying drawing wherein one embodiment of the invention is illustrated. It is to be expressly understood, however, that the drawing is for the purposes of illustration and description only, and is not to be construed as defining the limits of the invention.

In the drawing, Figure 1 is a plan view of a novel device constructed according to the invention for indicating the relative phases of a pair of waves recorded on a chart of a two-wave recorder.

Figure 2:
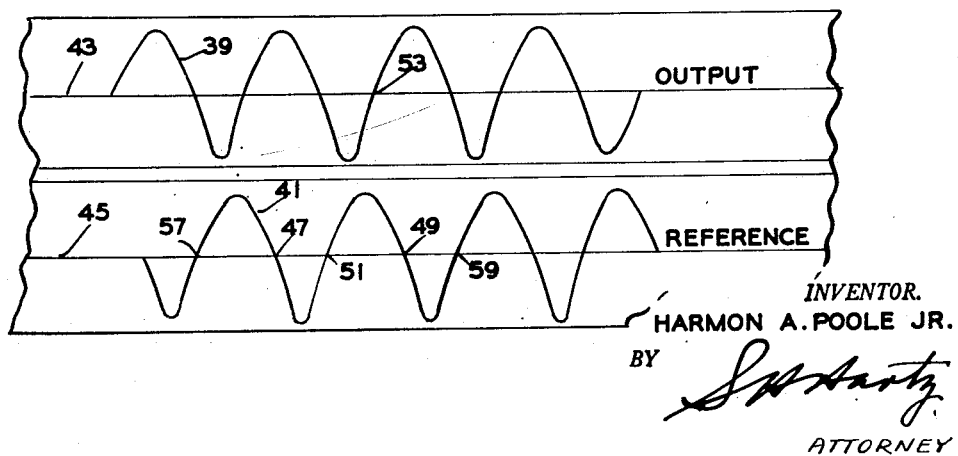

Figure 2 shows a chart of a two-wave recorder adapted for use with the novel device of the present invention and having recorded thereon a pair of non-symmetric waves.

Referring now to the drawing for a more detailed description of the novel device of the present invention for measuring the relative phases of a pair of recorded waves, the device is shown in Figure 1 as comprising a reference member 1 having a pair of parallel lines 3, 5 extending lengthwise thereof. A slide member 7 is slidably mounted on reference member 1 for movement transversely thereof and perpendicularly to parallel lines 3, 5. The reference member and slide member may be held together by a dovetailed connection or in any other suitable manner.

A pair of isosceles triangles 9, 11 are drawn on slide member 7 and the triangles have a common base line 13 extending parallel to lines 3, 5 on reference member 1. The base of each triangle is equal to its height as measured along a center line 15, extending lengthwise of slide member 7 and perpendicular to base line 13 and to parallel lines 3, 5. The sides 17, 19 of triangle 9 are disposed at an angle $\theta$ and the sides 21, 23 of triangle 11 parallel to sides 17, 19 converge at an angle $\phi$. With this arrangement, angle $\theta$ and angle $\phi$ equal 53 degrees 8 minutes. Center line 15 bisects angles $\theta$ and $\phi$ and the apex of angle $\theta$ is spaced from the apex of angle $\phi$ along center line 15 a distance equal to the distance between parallel lines 3 and 5. A series of degree lines 25 converge at the apex of angle $\phi$ and are spaced equally along base line 13 at each side of center line 15 between sides 21, 23 of triangle 11, and are calibrated proportionately in degrees, center line 15 being marked zero degrees and sides 21, 23 being marked 180 degrees.

To avoid parallax in adjusting the device to a chart, as described below, slide member 7 preferably is positioned directly adjacent the chart and the lines are ruled on the sides of the slide member and the reference member adjacent the chart.

The device may be used for measuring the phase difference of a pair of recorded symmetric periodic waves including an output wave 27 and a reference wave 29 of the kind shown in Figure 1 by positioning reference member 1 so that lines 3, 5 are in registry with null lines 28, 30 of the chart. The device is moved lengthwise along the null lines until center line 15 on slide member 7 passes through a null point, such as 31, of reference wave 29. Slide member 7 is moved perpendicularly to center lines 3, 5 until the outer sides 17, 19 of triangle 9 pass through null points 33, 35 of reference wave 29 adjacent null point 31. The portion of reference wave between null points 33, 35 corresponds to a single cycle. The phase difference may be read directly on the device on the degree scale at base line 13 of triangle 11 by noting the radial degree line 25 which passes through null point 37 of output wave 27 corresponding to null point 31 on reference wave 29. If none of the lines pass directly through null point 37 of output wave 27, the angle may be determined by linear interpolation along reference line 3. Whether the phase of the output wave leads or lags the reference wave is determined by the direction of motion of the tape on which the waves are recorded as it passes through the recorder and by the position of the null of the output wave relative to center line 15.

The device may be used also to determine phase difference between a pure sine reference wave and a non-symmetric periodic output wave by taking readings on the scale in the manner described for two successive nulls on the output wave and then averaging the readings.

The device may be used also to determine the phase shift of a non-symmetric output wave 39 relative to an identical non-symmetric reference wave 41 as shown in Figure 2. The device may be used in either of two methods to accomplish this end. In both methods, reference member 1 is positioned on the chart so that parallel lines 3, 5 are in registry with null lines 43, 45 of the chart.

In one method, the device is moved lengthwise along null lines 43, 45 and slide member 7 is moved perpendicularly to the null lines until sides 17, 19 of triangle 9 pass through null points, such as 47, 49, defining a single cycle of the reference wave. The device then is moved lengthwise of the null lines until center line 15 passes through null point 51 of the cycle defined by null points 47, 49. The phase difference between output wave 39 and reference wave 41 may be read directly on the device from the radial degree line 25 which passes through the corresponding null point 53 of the output wave or by linear interpolation along null line 43.

The second method comprises moving the device lengthwise of null lines 43, 45 until center line 15 passes through null point 51. Slide member 7 is moved relative to reference member 1 transversely of null lines 43, 45 until sides 17, 19 of triangle 9 pass through null points 57, 59 of the reference wave defining two complete cycles, one at each side of null point 51. The phase difference between the reference wave and the output wave may be read on the degree scale by doubling the reading of the degree line 25 extending through null point 53 on output wave 39 or by interpolating linearly along null line 43. Likewise, the phase difference may be obtained by using any other even number of complete cycles instead of two as described above. In this case, the reading is multiplied by the number of complete cycles used.

The device and method described facilitate determining the phase difference between a pair of recorded periodic waves and avoids the tediousness of the methods used heretofore. While no mechanism has been shown for sliding slide member 7 relative to reference member 1, it may be desirable to use gearing or any other suitable means to provide for accurately positioning the slide member relative to the reference member in proper position on the chart.

It should be understood that lines 15, 17, 19, 23 and 25 may be of any suitable length without actually completing triangles 9 and 11 without affecting the accuracy of the instrument. Also, the distance between the apex of angle $\theta$ and the apex of angle $\phi$ may be varied as determined by the distance between the null lines on the chart.

When determining the phase difference between a pair of recorded waves with the device according to the several methods described, the device may be of transparent or semi-transparent material and be placed between the chart and the observer, or the device may be of non-transparent material and placed on the side of the chart remote from the observer, whereupon the chart should be of transparent or semi-transparent material, such as thin paper. Also, it is immaterial whether the device is moved relative to the chart or whether the chart is moved relative to the device.

Although but one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

What is claimed is:

1. In a device of the kind described for determining the relative phases of a pair of periodic waves recorded about spaced parallel null lines, a reference member having a reference line adapted to be positioned in registry with the null line of one of the waves, a slide member slidable perpendicularly to said reference line relative to said reference member and having thereon a pair of lines disposed at a predetermined angle to one another and having a series of lines converging at a point, one of said members having a center line disposed to bisect said angle and to pass through said point, and said point being spaced along said center line from the apex of said angle a distance equal to the distance between the null lines of the recorded periodic waves.

2. In a device of the kind described for determining the relative phases of a pair of periodic waves recorded on a chart about a pair of null lines, a reference member having a reference line adapted to be positioned in registry with the null line of one of the waves, a slide member slidable perpendicularly to said reference line relative to said reference member and having thereon a pair of lines disposed at an angle of 53 degrees 8 minutes to one another and having a series of lines converging at a point, one of said members having a center line disposed to bisect the angle and to pass through said point, said point being spaced along said center line from the apex of said angle a distance equal to the distance between the null lines on the chart.

3. In a device of the kind described for determining the relative phases of a pair of periodic waves recorded on a chart about a pair of null lines, a reference member having a reference line adapted to be positioned in registry with the null line of one of the waves, a slide member slidable perpendicularly to said reference line relative to said reference member and having thereon a pair of lines disposed at an angle of 53 degrees 8 minutes to one another and having a series of lines converging at a point, one of said members having a center line disposed to bisect the angle and to pass through said point, said point being spaced along said center line from the apex of said angle a distance equal to the distance between the null lines on the chart, and a scale calibrated in angular measurements associated with said converging lines.

4. In a device of the kind described, a reference member having a pair of parallel lines thereon, and a slide member slidable perpendicularly to said parallel lines relative to said reference member and having thereon a pair of lines disposed at a predetermined angle to one another and having a series of lines converging at a point, one of said members having a center line disposed to bisect said angle and to pass through said point, and said point being spaced along said center line from the apex of said angle a distance equal to the distance between said parallel lines on said reference member, and a scale calibrated in angular measurements associated with said converging lines.

5. In a device of the kind described, a reference member having a pair of parallel lines thereon, and a slide member slidable perpendicularly to said parallel lines relative to said reference member and having thereon a pair of lines disposed at a predetermined angle to one another and having a series of lines converging at a point, one of the lines of said series being disposed to bisect said angle and to pass through said point, said point being spaced along said one line from the apex of said angle a distance equal to the distance between said parallel lines on said reference member, and a scale calibrated in angular measurements associated with said converging lines.

6. In a device of the kind described for determining the relative phases of a pair of periodic waves recorded about a pair of null lines, a reference member having a reference line adapted to be positioned in registry with the null line of one of the waves, and a slide member slidable perpendicularly to said reference line relative to said reference member and having thereon a pair of lines disposed at an angle of 53 degrees 8 minutes to one another and having a series of lines converging at a point, a pair of the lines of said series being parallel to said other pair of lines, one of the lines of said series being disposed to bisect said angle and to pass through said point, said point being spaced along said one line from the apex of said angle a distance equal to the distance between said null lines, and a scale calibrated in degrees associated with said converging lines, said pair of lines of said series being marked 180 degrees and said one line of said series being marked zero degrees, and the remainder of the lines of said series between said one line and said pair of lines of said series being calibrated in degrees proportionately.

7. In a device of the kind described for determining the relative phases of a pair of periodic waves recorded about a pair of null lines, a reference member having a reference line adapted to be positioned in registry with the null line of one of the waves, a slide member slidable in a direction perpendicularly to said reference line relative to said reference member and having thereon an isosceles triangle having a base equal in length to a center line perpendicular to the base and bisecting the angle defined by the sides of the triangle, said reference member having a series of lines thereon converging at a point on said center line spaced from the apex of said angle a distance equal to the distance between the null lines of the recorded waves, and said series of lines being calibrated in angular measurements to facilitate reading the phase difference of the recorded waves.

8. In a device of the kind described, a reference member having a pair of parallel lines, and a slide member slidable perpendicularly to said parallel lines relative to said reference member and having thereon a pair of isosceles triangles, each having a base equal in length to a center line perpendicular to the base and bisecting the angle defined by the sides of the triangle, the sides of one triangle being parallel to the sides of the other triangle and the distance between the apeces of the angles of said triangles along said center line being equal to the distance between the parallel lines on said reference member, one of said triangles having a series of lines spaced equally along the base line and converging at the apex of the angle defined by the sides of the associated triangle.

9. In a device of the kind described, a reference member having a pair of parallel lines, and a slide member slidable perpendicularly to said parallel lines relative to said reference member and having thereon a pair of isosceles triangles, each having a base equal in length to a center line perpendicular to the base and bisecting the angle defined by the sides of the triangle, the sides of one triangle being parallel to the sides of the other triangle and the distance between the apeces of the angles of said triangles along said center line being equal to the distance between the parallel lines on said reference member, one of said triangles having a series of lines spaced equally along the base line and converging at the apex of the angle defined by the sides of the associated triangle, and a scale calibrated in degrees along the base of the triangle and associated with said series of lines, said center line being marked zero degrees and the sides of the associated triangle being marked 180 degrees.

10. In a device of the kind described for determining the relative phases of a pair of periodic waves recorded about spaced parallel null lines, a transparent reference member having a reference line adapted to be positioned in registry with the null line of one of the waves, a transparent slide member slidable perpendicularly to said reference line relative to said reference member and having thereon a pair of lines disposed at a predetermined angle to one another and having a series of lines converging at a point within the angle defined by said pair of lines, one of said members having a center line disposed to bisect said angle and to pass through said point, and said point being spaced along said center line from the apex of said angle a distance equal to the distance between the null lines of the recorded periodic waves.

11. In a device of the kind described for determining the relative phases of a pair of periodic waves recorded on a chart, a reference member having means for aligning said member in predetermined position relative to said chart, a member movable relative to said reference member and having thereon a pair of lines disposed at a predetermined angle to one another and having a series of lines converging at a point, one of said members having a center line disposed to bisect said angle and to pass through said point, and said point being spaced from the apex of said angle a distance equal to the distance between the loci of null points of the waves.

12. In a device of the kind described for determining the relative phases of a pair of periodic waves recorded on a chart, a reference member having means for aligning said member in predetermined position relative to said chart, a member movable relative to said reference member and having thereon a pair of lines disposed at a predetermined angle to one another and having a series of lines converging at a point, and said point being spaced from the apex of said angle a distance equal to the distance between the loci of null points of the waves and being positioned relative to said angle so that a line drawn through said point and the apex of said angle bisects said angle.

HARMON A. POOLE, Jr.

REFERENCES CITED

The following references are of record in the file of this patent:

UNITED STATES PATENTS

| Number | Name | Date |
|---|---|---|
| 1,232,290 | Grunberg | July 3, 1917 |
| 1,271,907 | Jury | July 9, 1918 |
| 1,416,519 | Sparr | May 16, 1922 |
| 1,930,478 | Jones | Oct. 17, 1933 |
| 2,088,533 | Phelps | July 27, 1937 |